Patented May 6, 1952

2,595,798

UNITED STATES PATENT OFFICE 2,595,798

N-ORGANOLEAD-2,3-DIHYDROPHTHALA-ZINE-1,4-DIONES

Waldo B. Ligett, Berkley, Rex D. Closson, Detroit, and Calvin N. Wolf, Ferndale, Mich., assignors to Ethyl Corporation, New York, N. Y., a corporation of Delaware No Drawing. Application October 28, 1950, Serial No. 192,807

4 Claims. (Cl. 260—242)

This invention relates to novel organolead compounds. In particular our invention relates to organolead compounds in which the lead atom is linked through a nitrogen atom to a 2,3-dihydrophthalazine-1,4-dione.

It is, therefore, an object of our invention to provide a new class of lead compounds. It is a particular object of our invention to provide organolead compounds which find utility as biocides, as for example fungicides, bactericides and insecticides.

In accordance with the present invention we have provided compounds of the general formula

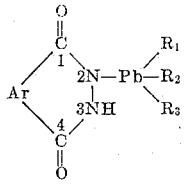

wherein Ar is o-arylene or substituted o-arylene, and each of $R_1$, $R_2$, and $R_3$ is the same or different and can be alkyl or aryl.

We have discovered that the fundamental structure of our compounds, that is the N-organolead-2,3-dihydrophthalazine-1,4-dione, provides a biocidal material which does not possess certain serious disadvantages associated with prior organolead compounds and which have prevented commercial utilization of the highly potent organolead compounds heretofore known as biocides. Our compounds have such water solubility and volatility characteristics that they are particularly useful in applications where weathering is encountered, as for example in protecting wood against soil infesting fungi, or in protecting tentage. Furthermore, as seed protectants we obtain long-term protection under adverse conditions by employing our compounds.

It is not intended that the scope of our invention be limited by the groups $R_1$, $R_2$, and $R_3$ in the foregoing general formula, as these groups can be chosen from among a broad class of groups without altering the biocidal properties of our compounds. For example, the $R_1$, $R_2$, and $R_3$ groups may be chosen from alkyl and aryl groups, as methyl, ethyl, propyl, isopropyl, amyl, hexyl, octyl, dodecyl, phenyl, tolyl, xylyl, $\alpha$-naphthyl, $\beta$-naphthyl, and ethylphenyl. These hydrocarbon components can also be the same or different. Thus, the trimethyl-, triethyl-, tripropyl-, triphenyl-, dimethylethyl-, diethylmethyl-, dimethylphenyl-, diphenylethyl-, dimethyl-p-tolyl-, diethylpropyl- and methylpropylbutyl- lead groups are typical examples of the N-organolead radicals which can be employed with our 2,3-dihydrophthalazine-1,4-diones.

Furthermore, it is not intended that our invention be restricted by the choice of the group Ar. Thus, we can employ o-phenylene itself or substituted derivatives thereof, in various embodiments of the compounds of our invention as well as o-naphthylene. For example, the o-arylene can be substituted with one or more alkyl groups, such as methyl, ethyl, propyl, octyl, phytyl or various combinations thereof. Furthermore, the o-arylene group can be substituted with one or more negative groups, as for example the halogens, nitro, amino, mono- and dialkyl-amino, alkoxy or carbalkoxy groups, as well as sulfur containing negative groups, such as mercapto, trichloromethylthio, and alkyl or aryl mercaptan. In addition, two or more substituents, the same or different, can be substituted at once on the o-arylene radical.

A general method for preparing the N-organolead-2,3-dihydrophthalazine-1,4-diones of our invention comprises treating an aqueous alkali suspension or solution of the appropriate 2,3-dihydrophthalazine-1,4-dione with the desired trihydrocarbonlead salt. Reaction proceeds readily and the products are easily recovered in high yield and purity. In the specific example which follows of one method of preparing a representative member of the compounds of our invention all the parts and percentages are by weight.

EXAMPLE

*N-triethyllead - 2,3 - dihydrophthalazine - 1,4-dione.*—To a stirred reaction vessel containing a solution of 12 parts of sodium hydroxide in 900 parts of water was added 48.6 parts of 2,3-dihydrophthalazine-1,4-dione. The mixture was stirred at a temperature of 25° C. until all solids were dissolved whereupon 100 parts of triethyllead chloride was added with continued agitation. At the end of an addition period of two hours, the solid product was recovered by filtration. The crude N-triethyllead-2,3-dihydrophthalazine-1,4-dione (120 parts) was purified by dissolving it in 100 parts of ethanol and precipitating the pure product by addition of 600 parts of water. From this treatment there was obtained 81.6 parts of product, corresponding to a yield of 59.5 per cent. By analysis this material was shown to contain 46.0 per cent lead and 6.8 per cent nitrogen, while the formula $C_{14}H_{20}O_2N_2Pb$ requires 45.5 per cent lead and 6.2 per cent nitrogen.

Other N-organolead-2,3-dihydrophthalazine-1,4-diones of our invention can be prepared by a similar process. Thus, when we treat triphenyllead chlorides, dimethylethyllead bromide, diethylphenyllead iodide, dimethyloctyllead sulfate, ditolylpropyllead chloride, or trimethyllead chloride with 5-nitro-5-amino-7-nitro-5-trichloromethylthio-, 5-mercapto-6-methyl-5-chloro-6-fluoro-7-nitro-, and 5,6,7,8-tetrachloro-2,3-dihydrophthalazine-1,4-dione, respectively, we obtain N-triphenyllead-5-nitro-, N-dimethylethyl-5-amino-7-nitro-, N-diethylphenyl-5-trichloromethylthio-, N-dimethyloctyl-5-mercapto-6-methyl-, N-ditolylpropyl-5-chloro-6-fluoro-7-nitro- and N-trimethyl-5,6,7,8-tetrachloro-2,3-dihydrophthalazine-1,4-dione.

The compounds of our invention can be employed as fungicides and for the prevention of the germination of the spores of fungi. To demonstrate the utility of the N-organolead-2,3-dihydrophthalazine-1,4-diones of our invention as fungicidal compositions we determined the concentration at which the germination of 50 per cent of the spores of each of the fungi *Alternaria oleracea* and *Sclerotinia fructicola* is inhibited. The former is responsible for the potato blight, while the latter causes peach rot. These fungi are representative of fungus types which are responsible for heavy crop damage. The ability to control these fungi is a reliable indication of the general applicability of our fungicides to protect these and other important agricultural crops. These tests were conducted as follows: 100 parts of the active ingredient was triturated with 1,000 parts of distilled water containing one part of the commercial dispersant Triton X-100. This standard suspension was thereupon further diluted with distilled water and the concentration at which one-half of the fungi contained in a drop of water on a microscope slide were prevented from sporilating was determined. For example, under these conditions N-triethyllead-2,3-dihydrophthalazine-1,4-dione was effective at a concentration as low as 1 p. p. m. When the following typical examples of the compounds of our invention are so applied to cultures of these fungi, they are also effective at a similar low concentration: N-trimethyllead-5,6-dichloro-2,3-dihydrophthalazine-1,4-dione, N-diphenylethyllead-6-amino-2,3-dihydrophthalazine-1,4-dione, N-methylethylpropyllead-5,6,7,8-tetrachloro-2,3-dihydrophthalazine-1,4-dione and N-triphenyllead-5,7-dinitro-2,3-dihydrophthalazine-1,4-dione.

Other examples of the novel class of compounds which we have provided will be apparent, those specific examples enumerated herein being merely illustrative. Furthermore, other methods for their preparation will be apparent to those skilled in the art, and the foregoing example of preparation is presented merely to illustrate one method for their preparation.

We claim:

1. As new compositions of matter, N-organolead-2,3-dihydrophthalazine-1,4-diones having the following general formula:

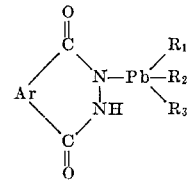

wherein $R_1$, $R_2$ and $R_3$ are hydrocarbon groups selected from the class consisting of phenyl groups and alkyl groups, and Ar is an o-phenylene radical.

2. The new compositions defined in claim 1 wherein $R_1$, $R_2$ and $R_3$ are alkyl groups.

3. The new compositions defined in claim 1 wherein $R_1$, $R_2$ and $R_3$ are phenyl groups.

4. As a new composition of matter, N-triethyllead-2,3-dihydrophthalazine-1,4-dione.

WALDO B. LIGETT.
REX D. CLOSSON.
CALVIN N. WOLF.

No references cited.